United States Patent Office 3,238,154
Patented Mar. 1, 1966

3,238,154
PREPARATION OF A POLYURETHANE RESIN USING A TETRAALKYL GUANIDINE AS A CATALYST
Paul R. Mosso, Natrona Heights, Pa., assignor to Pittsburgh Plate Glass Company, Pittsburgh, Pa., a corporation of Pennsylvania
No Drawing. Filed Aug. 10, 1961, Ser. No. 130,466
12 Claims. (Cl. 260—2.5)

This invention relates to a catalyst for the curing of mixtures of organic diisocyanates and polyols to form polyurethane resins, and it has particular relation to a catalyst for curing of said mixtures of diisocyanates and said polyols in the formation of foamed polyurethane resins.

In the curing of mixtures of polyols and organic polyisocyanates to form polyurethane resins, it is customary to catalyze the reaction by adding a tertiary amine, of which many are available and representative examples of which comprise dimethylethanolamine, tetramethyl-1,3-butane diamine, N-methyl morpholine, triethylamine, triethylene diamine, and many others of like character. Many of these are objectionable because of volatility and odor, lack of activity, poor exotherm characteristics, and for other reasons. One of the best of these is triethylene diamine of the formula:

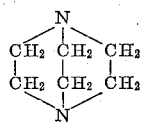

which is sold commercially under the trade name of Dabco. This material, when introduced in small amounts into a foamable mixture of a diisocyanate and a polyol, produces fast cures to form polyurethane resins, especially when it is used with an organic salt of tin as a synergist. The triethylene diamine has been used extensively in curing both rigid and flexible types of polyurethane resins, and it has heretofore been considered to have some advantages in the so-called "one shot" system wherein the organic polyisocyanate component is added to the whole of the polyol component and the other components of the foamable mixture, and all are reacted together in a single stage to form said foam.

However, the triethylene diamine, in spite of its general acceptance, is subject to several serious defects when used as a catalyst in polyurethane resin formation. For example, when used in effective amounts, it is relatively expensive. It is a solid material which is insoluble in the resin, except when heated, which cakes badly and is therefore difficult to incorporate into the conventional foamable mixtures. Also, gassing agents, such as the liquid but volatile chlorofluorocarbons, likewise tend to be insoluble in the resin mixtures and the triethylene diamine does not appreciably improve this solubility. Furthermore, triethylene diamine does not become reacted into the polyurethane resin and therefore it may retain its activity as a catalyst even after what is normally considered the conclusion of the polymerization reaction. This continued polymerization may result in deterioration of the polyurethane foam. Furthermore, the organic salts of tin used to synergize the reaction of the polyol component and the organic polyisocyanate tend further to impair the aging qualities of the finished foam.

This invention is based upon the discovery that tetraalkyl guanidines of the structure:

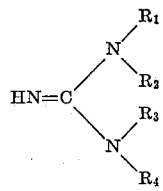

wherein groups $R_1$, $R_2$, $R_3$ and $R_4$ are like or unlike alkyl radicals, such as methyl, ethyl, propyl or butyl radicals, or isomeric propyl or butyl radicals, are excellent catalysts of the reaction of polyisocyanates and polyols to form polyurethane resins.

At least some of these tetraalkyl guanidines are relatively inexpensive to obtain. They are of low volatility, have little or no odor, and at least some thereof are liquid and are soluble in the polyol component of the resin. They also improve the compatibility of chlorofluorocarbons often used as gassing agents in the mixture. They can, therefore, easily be mixed with the reaction mixture.

Foamed resins wherein tetraalkyl guanidines have been used as catalysts are of excellent cell structure. The tetraalkyl guanidines are also often very fast catalyst of polyurethane formation, often very nearly as fast as the triethylene diamine, which is considered to be the best of the prior art materials, and they do not have the previously listed defects characterizing the latter. The use of a tin synergist or other synergists is, however, not required, but is not excluded. Moreover, while the tetraalkyl guanidines contain tertiary amine groups, they also contain an active hydrogen atom and they therefore can react with isocyanate groups in the foamable mixture. The catalyst (tetraalkyl guanidine) is thus permanently united with the polyurethane resin structure, thereby at least to a large extent immobilizing the catalyst and preventing the prolongation of the catalysis in the finished foams. The degradation attending residual catalysis in the finished resins is thus reduced or eliminated.

The tetraalkyl guanidine as disclosed herein may be used to catalyze the reaction of organic polyisocyanates and various polyols which contain a plurality of hydroxyl groups per molecule. One example of such polyol comprises castor oil and mixtures thereof with diols, such as polyethylene glycol. Another example of a polyol comprises a polyester containing a plurality of hydroxyl groups and being the product of polyesterification of a polyol and a dibasic acid, such as phthalic acid, isophthalic acid, terephthalic acid, succinic acid, adipic acid, and dimer acids from the addition reaction between molecules of acids from drying oil, such as linseed oil. Examples of polyhydric alcohols that may be used in forming the polyesters of these acids comprise glycol, diethylene glycol, triethylene glycol, propylene glycol, dipropylene glycol, butylene glycol, e.g., 3,4-butylene glycol, dibutylene glycol, and other diols. The polyesters also usually contain some polyol, such as glycerol, trimethylolethane, trimethylolpropane, pentaerythritol, and others. These polyols increase the functionality of the polyester molecules and thus give cross-linking effects which increase the strength and rigidity of the foams obtained. In most instances, it is desirable that the polyesters be of low acid number, e.g., 10 or below and even down to 0. The hydroxyl number should fall within a range of about 40 to about 600, the polyesters of low hydroxyl number being employed in the formation of flexible polyurethane resin foams and those of higher hydroxyl number, for example, about 200 or above, being employed in the formation of relatively rigid foams. The polyester molecules should also have a functionality of 3 or more per average molecule. That is, many molecules will contain at least three active hydrogens such as are provided by hydroxyl groups.

Still other polyols comprise the polyether polyols, which may be derived by reacting a polyol, such as diethylene glycol, with epichlorohydrin and then hydrolyzing the resultant diglycidyl ether. The resultant polyol obtained may be reacted directly with an organic polyisocyanate to form a polyurethane resin, or it may be esterified with a dicarboxylic acid, as already described, to provide a hydroxylated polyester that can then be reacted with a polyisocyanate.

Still another type of polyol which may be used in the practice of this invention comprises those polyether polyols such as may be obtained by oxyalkylating in the presence of an oxyalkylation catalyst, of a polyol such as glycerol, pentaerythritol, glucose, sucrose, or a polyphenol or other polyol, with an alkylene oxide, such as ethylene oxide, propylene oxide or butylene oxide. Many such oxyalkylated polyols are disclosed in Belgian Patent No. 584,739, to which reference is now made. The tetraalkyl guanidines may be used as catalysts in mixtures wherein the oxyalkylated phenols and the blends of oxyalkylated polyols as disclosed in the patent may be used as the polyol components.

The foregoing polyols may be mixed with various organic polyisocyanates and the mixtures catalyzed with tetraalkyl guanidines in the formation of polyurethane resins. Examples of such organic polyisocyanates comprise:

Toluene diisocyanate
Diphenyl diisocyanate
Triphenyl diisocyanate
Chlorophenyl-2,4-diisocyanate
Ethylene diisocyanate
1,4-tetramethylene diisocyanate
p-Phenylene diisocyanate
Hexamethylene diisocyanate
3,3'-dimethyl-4,4'-biphenylene diisocyanate
3,3'-dimethoxy-4,4'-biphenylene diisocyanate
Polymethylene polyphenyl isocyanate
Diphenylmethane-4,4'-diisocyanate It will also be apparent that the quasi-prepolymers of a polyisocyanate and a polyol, as hereinafter described, contain many molecules which contain a plurality of isocyanate groups per molecule and, therefore, they may be regarded under the broad terminology of this application as being organic polyisocyanates. Polyisocyanate compounds having an isocyanate equivalency in a range of about 50 to about 500 may be used. They may be mixed with additional polyol, such as one of the preceding polyols, in an amount to use up all or most of the isocyanate groups, thus providing a complete polyurethane resin. The polyol component and the organic polyisocyanate component are usually employed in amounts of approximate equivalency with respect to each other. In some instances, allowance should be made for evaporational losses of organic polyisocyanate before it has reacted with the polyol. In general, the polyisocyanate will not be used in an amount exceeding two equivalents per equivalent of polyol and will not be used in an amount below 50 percent of equivalency with respect to the polyol.

The amount of tetraalkyl guanidine used to catalyze the reaction should be in a range of about 0.1 to about 3 percent by weight based upon the polyurethane-forming components.

When the polyisocyanate-polyol mixtures are to be foamed, it is often desirable to incorporate a surfactant or emulsifying agent therewith designed to stabilize the freshly formed foam. These are not in all instances required, though they are helpful if foams of optimum quality are to be obtained. Examples of surfactants which may be used are listed by trade name and by composition in the publication entitled "Detergents and Emulsifiers (up to date, 1960)," published by John W. McCutcheon, Inc., New York, New York. Some of the more appropriate surfactants include the so-called Pluronics, sold by the Wyandotte Chemicals Corporation, which have been described as being condensates of ethylene oxide with a hydrophobic base formed by condensing propylene oxide with propylene glycol. These are of a molecular weight in a range of about 2000 to about 8000 and are ascribed the formula: $HO(C_2H_4O)_a(C_3H_6O)_b(C_2H_4O)_cH$. Members of the family are designated as:

L-61
L-44
L-62
L-64
P-75
F-68
P-84

The characteristics of these can readily be determined from the bulletin by the Wyandotte Chemicals Corporation, published in 1957 and entitled Presenting The Pluronic "Grid."

Another class of surfactants which may be used comprises the so-called Tetronics, which are formed by the addition of propylene oxide to ethylene diamine, followed by the addition of ethylene oxide. These compounds have been ascribed the formula:

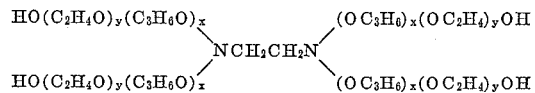

Another class of surfactants comprises the so-called Tweens, which are described as the monoesters of higher fatty acids, represented by lauric acid, stearic acid, oleic acid, and polyoxyethylene sorbitan.

Still another class of the more satisfactory surfactants which have been found very effective to maintain the cell structure in the foaming and curing of polyurethane resins comprises liquid derivatives of silicones. One such product is a Union Carbide product designated as X-521 which is approximately of the formula:

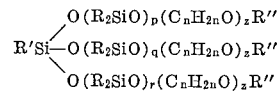

wherein R', R and R'' are monovalent hydrocarbon groups, $p$, $q$ and $r$ are integers of at least 1, $n$ is a number of about 2, 3 or 4, and $z$ is an integer of at least 5. One such material is sold as Dow Corning-199 which is a silicone-glycol copolymer, while another highly useful base surfactant of a material of substantially the same structural formula comprises the so-called X-521 sold by the Union Carbide Corporation. Other surfactants, especially the liquid or soluble nonionic members of the family, are useful. The surfactants may be employed in amounts within a range of about 0.1 to 3 percent by weight based upon the mixture of polyol component and the organic isocyanate component. In the relatively dense foams, for example, those weighing from about 5 to 6 pounds and upward per cubic foot, the surfactants may be omitted entirely.

In order to impart a cellular or foam structure to the polyurethane resins when catalyzed with a tetraalkyl guanidine in accordance with the provisions of this invention, a gas-producing agent should also be added to the mixture. Various systems for gas production and distribution can be employed. One of these comprises the addition of water in a small amount to a mixture of polyol and polyisocyanate. The water reacts with available isocyanate groups in the mixture to liberate carbon dioxide in situ. The gas thus produced becomes entrapped as small bubbles in the mixture and when the mixture cures, the cellular structure is permanently retained.

Still another system of cellulation involves the addition of a blowing agent or gassing agent, such as one of the fluorocarbons represented by the group: $CCl_3F$, $CCl_2F_2$, $C_2Cl_2F_4$, $CCl_2F$, $CClF_2$, $CHClF_2$, $CF_4$ and others, to a polyurethane-forming mixture. The blowing agent is added to the mixture of organic polyisocyanate or polyol under such conditions as will assure that it initially is in liquid phase. This may be accomplished by cooling the material below the boiling point or under such pressure as will prevent volatilization. When the mixture warms up or the pressure is relieved, the material volatilizes to produce a foaming effect. The amount of blowing agent may vary, for example, within a range of about 5 to about 50 percent by weight based upon the total mixture, dependent upon the degree of cellularity desired in the finished product.

In forming a foamed polyurethane resin, it is necessary that the reaction between the organic isocyanate and the polyol be restrained or withheld until the components have been disposed in the position they are to occupy in the cured product. To this end, it is usually necessary to divide the components of the mixture into separate packages (A and B), both of which have a reasonable degree of fluidity and which, so long as they are kept separate, are reasonably stable; but when mixed to provide the final formulation, promptly react to produce curing effects. One way to obtain this stability is merely to include the polyol in one package (A) and the polyisocyanate in the other package (B). The other components, including the gas-producing agent, catalyst and surfactant, are appropriately distributed in these packages. When a cured and foamed polyurethane resin is to be produced, the two packages are quickly agitated together and with or without pouring, are allowed to foam. Ultimately, the mixture is cured either without external heat or by baking as may be required. This is a so-called "one shot" system and has advantages of simplicity, speed and economy. Where feasible, this system is generally to be preferred. A disadvantage of this process has heretofore resided in the fact that the conventional solid catalyst, such as triethylene diamine, could not be uniformly and rapidly mixed into the other resin-forming components. It often produced premature reaction of the polyol and the organic polyisocyanate before adequate distribution could be attained.

Paradoxically, the tetraalkyl guanidines disclosed herein, when used as catalysts in such systems, can readily be blended into the other components to provide a relatively uniform mixture which will cure very rapidly to provide an excellent product.

Heretofore, in order to promote the ease of mixing in the formulation of foamable mixtures, it has been quite common to form so-called quasi-prepolymers wherein the polyisocyanate component of the reaction mixture is added to a part of the polyol component as a preliminary step. In the preparation of foams, there is no lower limit upon the ratio of polyol of the isocyanate because all of the isocyanate may be incorporated with the polyol to provide the final foam formulation. On the other hand, the addition of too much of the total polyol in the prepolymer is objectionable since it may cause premature gelation. Prepolymers containing from about 1 to about 30 percent of polyol, the rest being isocyanate, are feasible.

In this prepolymer process, it is probable that some of the exotherm of the reaction is spent in the prepolymer stage and when the catalyst and other ingredients are added to effect the final cure, the temperature of the exotherm does not rise so fast or go so high or remain in the elevated range for as long as it would in the "one shot" system. Also, the amount of agitation required to obtain uniformity in the mixture is reduced. For these and perhaps other reasons, the problem of obtaining uniform mixing without premature setting is reduced by the use of the prepolymer technique.

While all of the advantages of using tetraalkl guanidine as a catalyst may not be present when the quasiprepolymer technique is followed in forming the polyurethane foams, it is still highly satisfactory and its use therein is therefore within the purview of the invention.

In mixtures wherein the tetraalkyl guanidine is used as a catalyst of polyurethane formation, curing may be effected without application of external heat. However, if very fast cures are desired, the bodies may be heated, for example, in an oven at a temperature up to about 250° F. or 300° F. until full cure is attained. Usually, this will take place within about 10 minutes to 2 hours.

The following examples illustrate the formation of foamed polyurethane resins from a polyisocyanate and a polyol using a tetraalkyl guanidine as a catalyst.

*Example I*

In this example, the catalytic effects of tetramethyl guanidine and several other well-known catalysts were compared in a typical foamable formulation of a polyol and an organic diisocyanate. The polyol employed was the oxyalkylation product of 1 mole of sucrose, 11 moles of propylene oxide and 4 moles of ethylene oxide. This product was of a hydroxyl value of about 470. In preparing the polyol, sucrose was liquified with an aqueous solution of caustic soda, and the alkylene oxides were added under heat and pressure in an autoclave until the desired moles of said alkylene oxides had been absorbed.

A quasi-prepolymer was prepared from this polyol and a mixture of isomers of toluene diisocyanate comprising 80 percent of 2,4-isomer and 20 percent of 2,6-isomer. The ratio of the polyol and the toluene diisocyanate isomers was adjusted to provide an isocyanate equivalent of 140.

A series of samples of a foamable mixture was prepared, each sample comprising:

|  | Parts by weight |
|---|---|
| Package A: | |
| Prepolymer | 100 |
| Gassing agent ($CCl_3F$) | 36 |
| Package B: | |
| Added polyol (same as in prepolymer) | 88.5 |
| Emulsifier (XL-521) | 1 |

To package B of each of the samples was added 0.7 part by weight of an amine catalyst.

The mixtures were then allowed to foam and cure at atmospheric temperature, and the set time of the mixture and the density of the final product were determined. The results were as follows:

| Catalyst | Set Time (seconds) | Density (lbs./cu. ft.) |
|---|---|---|
| Triethylene diamine (Dabco)[1] | 64 | 1.5 |
| Dimethylethanolamine | 300 | 1.7 |
| Tetramethyl butane diamine | 120 | 1.6 |
| N-methyl morpholine | 585 | 1.9 |
| Triethylamine | 242 | 1.8 |
| Tetramethyl guanidine[2] | 87 | 1.5 |

[1] Dabco—100 percent pure.
[2] The tetramethyl guanidine was a commercial material 90 percent pure. It was a liquid, was compatible with added polyol, even at atmospheric temperature.

In these samples, the triethylene diamine was slightly the fastest catalyst in the series. However, it had a bad odor and moreover, because of its solid state and relative insolubility in the polyol, it had to be added separately to the polyol component while the latter was hot (100° C. to 115° C.) and even then, the addition was difficult and time consuming. At least a part of the advantage in set time for the mixture containing the triethylene diamine, as compared with the tetramethylene guanidine, may be attributed to the greater purity of the triethylene diamine.

The tetramethyl guanidine, being liquid, was very readily incorporated with the polyol. The catalysts, other than the triethylene diamine and the tetramethyl guanidine, were all comparatively slow and would not be satisfactory in commercial operations for that reason. The liquid amine catalysts, other than the tetramethyl guanidine, were also readily volatile and were characterized by bad odors.

In this and the subsequent examples, it will be recognized that the material containing isocyanate groups should not include free polyol and the catalyst component until just before the foam is to be formed. For this reason, the material containing isocyanate groups, e.g., the prepolymer, is always formulated as or in package A. The free polyol and the catalyst are formulated in package B. The nonreactive ingredients; namely, the blowing agent and emulsifying agent, may be formulated with either package A or package B.

*Example II*

In this example, a polyurethane foam was prepared wherein the polyol component corresponded to that of Example I and was from 1 mole of sucrose, 11 moles of propylene oxide and 4 moles of ethylene oxide.

A quasi-prepolymer was prepared from this polyol comprising:

|  | Percent |
|---|---|
| Sucrose polyol | 22 |
| Toluene diisocyanate (80-20 mixed isomers) | 78 |

A catalyzed foamable mixture was then prepared comprising:

|  | Parts by weight |
|---|---|
| Package A: |  |
| Prepolymer | 100 |
| Emulsifier (Dow Corning silicone 199) | 1 |
| Package B: |  |
| Added polyol (same as prepolymer) | 83 |
| Gassing agent (CCl$_3$F) | 38 |
| Tetramethyl guanidine | 0.4 |

This mixture was allowed to foam and cure at atmospheric temperature, but the rate of cure could be expedited, if desired, by application of external heat. The resultant body was of fine cells and was of generally good foam characteristics.

The set time of the mixture was 72 seconds and the density was 1.6 pounds per cubic foot.

*Example III*

The foam prepared in this example was designed to have improved flame retardant characteristics, which effect was attained by the incorporation of antimony trioxide and of polyepichlorohydrin of the general formula:

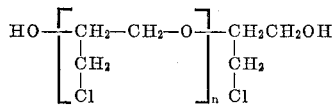

wherein *n* was of such value as to provide a viscous liquid material of a molecular weight of about 1150. The polyol component of the foamable mixture comprised polyoxyalkylated sucrose containing 1 mole of sucrose, 11 moles of propylene oxide and 4 moles of ethylene oxide.

A part of this polyol and the polyepichlorohydrin were mixed and combined with toluene diisocyanate (80-20 mixed isomers) to form a quasi-prepolymer of the composition:

|  | Parts by weight |
|---|---|
| Polyol | 18 |
| Polyepichlorohydrin | 10 |
| Toluene diisocyanate | 72 |

The prepolymer was incorporated into a foamable mixture comprising:

|  | Parts by weight |
|---|---|
| Package A: |  |
| Prepolymer | 100 |
| Emulsifier (XL-521) | 1.0 |
| Package B: |  |
| Added polyol | 60 |
| Diethylene triamine-propylene oxide [1] | 9.9 |
| Gasing agent (CCl$_3$F) | 38 |
| Antimony trioxide | 10 |
| Tetramethyl guanidine | 0.3 |

[1] Having the formula:

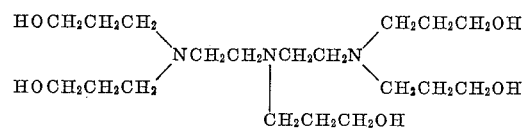

The mixture was allowed to foam and cure at room temperature to provide a cellular body wherein the cells were relatively fine and uniform. The set time of the mixture was 82 seconds and the density was 1.6 pounds per cubic foot.

*Example IV*

This example illustrates a so-called "one shot" system of preparing a polyurethane resin foam wherein the preliminary step of forming a quasi-prepolymer of a part of the polyol and the polyisocyanate was dispensed with. The polyol component of the mixture was the same sucrose-propylene oxide-ethylene oxide polyol already described. The polyisocyanate component was a crude material sold as Nacconate 4040. This material had an isocyanate equivalent of about 107. On the other hand, 94 parts by weight of the 80-20 mixed isomers is equivalent to 117 parts of the Nacconate 4040.

The foamable mixture comprised:

|  | Parts by weight |
|---|---|
| Package A: |  |
| Nacconate 4040 | 100 |
| Emulsifier (XL-521 silicone) | 1 |
| Package B: |  |
| Polyol (same as above) | 106 |
| Diethylene triamine-propylene oxide reaction product | 5 |
| Tetramethyl guanidine | 1.1 |
| Gassing agent (CCl$_3$F) | 38 |

In formulating the mixture, the Nacconate 4040 and the XL-521 silicone emulsifier were mixed together as package A and the remaining components were also mixed together as package B. The tetramethyl guanidine was liquid and could easily be incorporated into package B even at room temperature. The packages A and B were then intermixed in well-known manner to provide the complete foamable mixture. The characteristics of the material were:

Set time _____ 74 seconds.
Density _____ 1.65 pounds per cubic foot.

The foam was of good characteristics and it was apparent that the tetramethyl guanidine was very satisfactory as a catalyst.

*Example V*

This example was similar to Example IV, except that a pure 80-20 mixture of toluene diisocyanate isomers, sold commercially as Hylene-TM, was employed. A first package was prepared comprising:

|  | Parts by weight |
|---|---|
| Toluene diisocyanate | 80 |
| Emulsifier (XL-521) | 1 |

A second package was prepared comprising:

| | Parts by weight |
|---|---|
| Sucrose polyol | 110 |
| Diethylene triamine-propylene oxide reaction product | 10 |
| Tetramethyl guanidine | 0.55 |
| Polyvinyl chloride | 21 |
| Antimony trioxide | 10 |
| Gassing agent ($CCl_3F$) | 32 |

The mixture had a set time of 78 seconds at atmospheric temperature. The density of the foam was 1.9 pounds per cubic foot. The cellular structure was relatively fine and uniform.

*Example VI*

In this example, a small amount of dibutyl tin dilaurate was used in order to accelerate the curing of the catalyzed mixture, wherein the catalyst was tetramethyl guanidine. In the formulation of the foamable mixture, a crude toluene diisocyanate, sold by E. I du Pont de Nemours & Company as ECD-288, was employed. The polyol was the same as that previously described and comprised 1 mole of sucrose, 11 moles of propylene oxide and 4 moles of ethylene oxide. The foamable mixture comprised as packages A and B:

| | Parts by weight |
|---|---|
| Package A: | |
| Toluene diisocyanate | 100 |
| Emulsifying agent (XL-521) | 1 |
| Package B: | |
| Polyol | 108 |
| Diethylene triamine-propylene oxide | 5 |
| Propylene glycol-propylene oxide reaction product (OH value of 440) | 5 |
| Tetramethyl guanidine | 0.8 |
| Dibutyl tin dilaurate | 0.1 |
| Gassing agent ($CCl_3F$) | 38 |

This mixture had a set time of 70 seconds. The mixture foamed and cured at atmospheric temperature. The foam had a density of 1.65 pounds per cubic foot.

*Example VII*

In this example, stannous octoate was used as an accelerator for the tetramethyl guanidine catalyst. The toluene diisocyanate was the same as that of Example VI. The polyol comprised 1 mole of sucrose, 11 moles of propylene oxide and 4 moles of ethylene oxide. The foamable mixture comprised:

| | Parts by weight |
|---|---|
| Package A: | |
| Toluene diisocyanate | 100 |
| Package B: | |
| Polyol | 106 |
| Propylene glycol-propylene oxide | 5 |
| Diethylene triamine-propylene oxide | 5 |
| Gassing agent ($CCl_3F$) | 38 |
| Emulsifier (XL-521 silicone) | 1 |
| Stannous octoate | 0.4 |
| Tetramethyl guanidine | 0.2 |

The set time of this mixture was 71 seconds and the density of the foam was 1.68 pounds per cubic foot. The foam was of fine, uniform cells.

*Example VIII*

This example is illustrative of the use of a polyester having available hydroxyls as a polyol component in the preparation of a foamable mixture. The polyester comprised:

| | Moles |
|---|---|
| Adipic acid | 8 |
| Phthalic anhydride | 1 |
| Ethylene glycol | 3.15 |
| Propylene glycol | 3.15 |
| Trimethylolpropane | 6.2 |
| Glycerine | 3.1 |

The mixture was esterified by heating with removal of water in conventional manner to provide a product having a hydroxyl value of about 350 to 500. A prepolymer was prepared from this polyol comprising:

| | Parts by weight |
|---|---|
| Toluene diisocyanate | 85 |
| Polyol (same as above) | 10 |
| Low molecular weight polyol (trimethylolpropane) | 5 |

An approximately equivalent amount of this prepolymer as package A was mixed with package B comprising the foregoing polyester, an emulsifier, a gas-producing agent for polyurethane resin foams, e.g., $CCl_3F$, and the mixture was foamed and cured to provide a foam of a density of about 1.6 to 1.7 pounds per cubic foot.

In the examples, the sucrose-propylene oxide-ethylene oxide polyol may be replaced in part or completely by other polyols, such as various polyols obtained by the oxyalkylation of starting polyols containing two, four, six or more hydroxyl groups per molecule. Other polyols of sucrose obtained by oxyalkylation of sucrose with about 10 to about 30 moles of an alkylene oxide, such as ethylene oxide, propylene oxide or butylene oxide, taken singly or in various mixtures, may be substituted in the examples for the polyol of 1 of sucrose, 11 moles of propylene oxide and 4 moles of ethylene oxide. Likewise, the polyol of the examples may be replaced by polyesters containing a plurality of hydroxyl groups per molecule and being of hydroxyl values in a range of about 40 to about 600.

Other volatile chlorofluorocarbons may be substituted for $CCl_3F$. The following constitute examples of such chlorofluorocarbons that may be used:

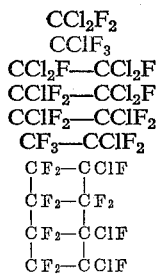

It will also be apparent that other agents than the chlorofluorocarbons may be used to generate gas. For example, a small amount (about 0.5 to about 3 percent by weight of the total mixture) of water may be added to the mixture of polyol and polyisocyanate. The water will react with available isocyanate groups to generate carbon dioxide in situ and the gas will form a cell structure.

It will be apparent that the toluene diisocyanate in the examples may be replaced in part or completely by other organic polyisocyanates, such as those which have heretofore been listed.

The tetraalkyl guanidines are highly effective catalysts which may be used as catalysts of urethane formation. The use of guanidine and its derivatives is also included in a like capacity. In some instances, they may be used in the curing of unfoamed mixtures of polyols and polyisocyanates.

The use of the tetraalkyl guanidines as catalysts in the curing of polyurethane foams has been observed to be particularly advantageous for the reasons already stated. However, the use of these material to catalyze the curing of unfoamed polyurethanes is also included.

The forms of the invention as herein shown and described are to be regarded as being by way of illustration. Numerous modifications may be made therein without departure from the spirit of the invention or the scope of the appended claims.

I claim:

1. A method of preparing a polyurethane resin which comprises forming a liquid mixture of an organic polyisocyanate, a polyol having a hydroxyl number of about 40 to about 600, and about 0.1 to about 3 percent by weight based upon the urethane forming ingredients of a tetraalkyl guanidine, and allowing the isocyanato groups of the polyisocyanate and the hydroxyl groups of the polyol to react to provide urethane linkages between the polyol and the polyisocyanate, the alkyl groups containing from 1 to about 4 carbon atoms.

2. A method of preparing a polyurethane resin foam which comprises forming a liquid mixture of an organic polyisocyanate, a polyol having a hydroxyl number between about 40 and about 600, and as a catalyst, the material having the formula:

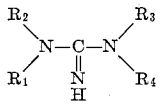

wherein groups $R_1$, $R_2$, $R_3$ and $R_4$ are alkyl radicals containing from 1 to about 4 carbon atoms, and a gas-producing agent for foaming of polyurethane resins, and allowing the isocyanato groups of the polyisocyanate and the hydroxyl groups of the polyol to react to form a structure wheren gas is entrapped as cells, giving a foam structure, and wherein the polyol molecules and the polyisocyanate molecules are interconnected by urethane linkages.

3. A method of preparing a polyurethane resin which comprises forming a liquid mixture of an organic polyisocyanate, a polyol having a hydroxyl number between about 40 and about 600, and as a catalyst, the compound having the formula:

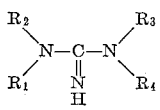

wherein the groups $R_1$, $R_2$, $R_3$ and $R_4$ are alkyl radicals containing from 1 to about 4 carbon atoms, the mixture further containing a fluorocarbon gassing agent, and allowing the mixture to foam and the isocyanato groups of the polyisocyanate and the hydroxyl groups of the polyol to react to provide urethane linkages between the molecules of the polyol and the polyisocyanate.

4. A method of forming a polyurethane resin which comprises preparing a liquid mixture of an organic polyisocyanate, a polyol having a hydroxyl number in a range of about 40 to about 600, and as a catalyst, a compound having the formula:

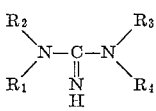

wherein the groups $R_1$, $R_2$, $R_3$ and $R_4$ are alkyl radicals containing from 1 to about 4 carbon atoms, said mixture further containing a small amount of free water, and allowing the mixture to foam by reaction of the water and the isocyanato groups to liberate carbon dioxide, and the resin to set by reaction of the hydroxyl groups and the isocyanate groups to provide urethane linkages.

5. A method of forming a polyurethane resin which comprises preparing a liquid mixture of an organic polyisocyanate, a polyester of a dicarboxylic acid and a polyol, said polyester having a hydroxyl value in a range of about 40 to about 600, and as a catalyst, a material having the formula:

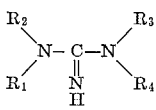

wherein the groups $R_1$, $R_2$, $R_3$ and $R_4$ are alkyl groups containing from 1 to about 4 carbon atoms, each containing from 1 to 4 carbon atoms, and allowing the hydroxyl groups and the isocyanato groups of said polyol and said organic isocyanate to react to provide urethane linkages.

6. A method of preparing a foamed polyurethane resin which comprises forming a liquid mixture of an organic polyisocyanate, a polyester of a dicarboxylic acid and a polyol, said polyester having a hydroxyl value in a range of about 40 to about 600, and as a catalyst, a material having the formula:

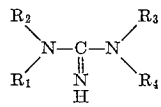

wherein the groups $R_1$, $R_2$, $R_3$ and $R_4$ are aliphatic hydrocarbon groups containing 1 to 4 carbon atoms, and allowing the hydroxyl groups and the isocyanato groups, respectively, of said polyol and said organic isocyanate to react to provide urethane linkages, said mixture further containing a gas-producing agent for polyurethane resin foams and being adapted to cause foaming action before the resin sets by reason of the formation of said linkages.

7. A method of preparing a foamed polyurethane resin which comprises forming a liquid mixture of an organic polyisocyanate, a polyester of a dicarboxylic acid and a polyol, said polyester having a hydroxyl value in a range of about 40 to about 600, and as a catalyst of polyurethane formation, a material having the formula:

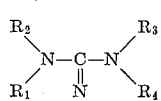

wherein $R_1$, $R_2$, $R_3$ and $R_4$ are alkyl groups, and allowing the hydroxyl groups and the isocyanate groups of said polyol and said organic isocyanate to react to provide urethane linkages, said mixture further containing a volatile fluorocarbon gassing agent adapted to volatilize before completion of the reaction between the hydroxyl groups and the isocyanato groups.

8. A method of preparing a polyurethane resin which comprises forming a liquid mixture of an organic polyisocyanate, a polyether polyol having a hydroxyl number in a range of about 40 to about 600, and as a catalyst of urethane formation, a material having the formula:

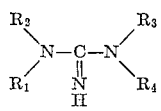

wherein the groups $R_1$, $R_2$, $R_3$ and $R_4$ are alkyl radicals containing from 1 to about 4 carbon atoms, and allowing the isocyanato groups and the hydroxyl groups of said polyol and said polyisocyanate to react to provide urethane linkages between the molecules.

9. A method of forming a polyurethane resin which comprises forming a liquid mixture of an organic polyisocyanate, a polyol having a hydroxyl number in a range between about 40 and about 600, and about 0.1 to about 3 percent by weight based upon the polyurethane forming ingredients of tetramethyl guanidine, and allowing the isocyanato groups of the polyisocyanate and the hydroxyl groups of the polyol to react to provide urethane linkages between the polyol and the polyisocyanate.

10. A method of forming a polyurethane resin foam which comprises forming a liquid mixture of an organic polyisocyanate having an isocyanato equivalency of about 50 to about 500, a polyol having a hydroxyl number in a range between about 40 and about 600, about 0.1 to about 3 percent by weight based upon the polyurethane forming ingredients of a catalyst comprising tetramethyl guanidine, and a gas-producing agent for polyurethane resin foams, and allowing the mixture to foam and cure.

11. A method of forming a polyurethane resin foam which comprises forming a liquid mixture of an organic polyisocyanate having an isocyanato equivalency of about 50 to about 500, a polyol having a hydroxyl number in a range between about 40 and about 600, and about 0.1 to about 3 percent by weight based upon the polyurethane forming ingredients of tetraalkyl guanidine wherein the alkyl groups are selected from the class consisting of methyl, ethyl, propyl and butyl groups, and a blowing agent for the polyurethane resin foams, and allowing the mixture to foam and cure.

12. A method of forming a polyurethane resin foam which comprises forming a liquid mixture of an organic polyisocyanate having an isocyanato equivalency of about 50 to about 500, a polyol having a hydroxyl number in a range between about 40 and about 600, and about 0.1 to about 3 percent by weight based upon the polyurethane forming ingredients of tetraalkyl guanidine wherein the alkyl groups are selected from the class consisting of methyl, ethyl, propyl and butyl groups, and a chlorofluorocarbon adapted by volatilization to produce foaming of the mixture, and allowing the mixture to foam and cure.

References Cited by the Examiner
UNITED STATES PATENTS

| | | | |
|---|---|---|---|
| 2,625,532 | 1/1953 | Seeger | 260—75 |
| 2,877,192 | 3/1959 | Burkus | 260—2.5 |
| 2,894,919 | 7/1959 | Simon et al. | 260—2.5 |
| 3,034,996 | 5/1962 | Kaplan | 260—2.5 |
| 3,134,742 | 5/1964 | Wismer et al. | 260—2.5 |

LEON J. BERCOVITZ, *Primary Examiner.*